May 27, 1969

W. R. SPOFFORD, JR

HYSTERESIS FREE PHASE CONTROL CIRCUIT
USING SILICON BILATERAL SWITCH

Filed Feb. 27, 1967

3,447,067

INVENTOR.
WALTER R. SPOFFORD, JR.

BY Paul E Rochford

ATTORNEY

United States Patent Office 3,447,067
Patented May 27, 1969

3,447,067
HYSTERESIS FREE PHASE CONTROL CIRCUIT USING SILICON BILATERAL SWITCH
Walter R. Spofford, Jr., Fayetteville, N.Y., assignor to General Electric Company, a corporation of New York
Filed Feb. 27, 1967, Ser. No. 618,632
Int. Cl. H02p 13/14
U.S. Cl. 323—22 1 Claim

ABSTRACT OF THE DISCLOSURE

A power control device having a bidirectional solid state semiconductor multi-layer power switch controlling the supply of alternating current power to a load. Phase control is achieved by an RC phase shifting network and a silicon bilateral switch. Firing of the silicon bilateral switch takes place symmetrically in both half cycles and full range hysteresis-free operation results.

The present invention relates to devices for controlling the supply of alternating current power to a load such as an electric lamp. More particularly the present invention relates to devices particularly well adapted for low-cost fabrication with thick film techniques for control of supply of electric power.

Solid state devices used in the control of electric power have been incorporated in control circuits and structures at progressively lower cost with the passage of time. In order to reduce the cost of power control circuits incorporating solid state switches, the number of incorporated auxiliary components such as resistors, capacitors, diodes and the like has been minimized to the point where performance of the power control device is erratic in the sense that the relationship between the movement as for example turning of the control element and the power supplied from these circuits is far from linear. Use of power controls having smaller numbers of parts concentrates the control over a short range of movement of the control element. Particularly, non-linear relationships are found together with a "pop on" type of performance as the power is turned on. Also the power level follows a hysteresis type path as the control element is moved to reduce the power. One application for which the marginal performance of low-cost conventional circuits becomes particularly acute is for the power control of low voltage power circuits as is evident when these circuits are employed in powering low voltage lamps.

One scheme which offers an opportunity to improve the performance of such circuits without significantly increasing the cost is the so-called thick film technique by which a number of passive circuit components can be added at a very small incremental cost for the addition of each component. The thick film technique offers the advantage therefore, of producing power control devices having high performance capabilities with a disproportionately small increase in the cost of the device for the addition of individual passive components.

Another factor which has limited the reduction in the cost of the conventional dimmers without sacrificing performance capability is the need for discrete packaging of the discrete components used in the conventional power control circuits. The use of unpackaged components has been limited in circuits formed with discrete components because of the need for interconnecting the discrete components of the circuit as well as the need for handling, assembling and maintaining relatively large dimensional clearances between the exposed interconnections. In general, the use of the unenclosed components such as solid state chips is not compatible with the size of the structure resulting from assembly of discrete component circuits even where the reduced size advantage of printed circuit-board type of interconnection is employed.

From the foregoing it is evident that a technique such as the thick film technique which makes possible the use of the unenclosed circuit components and the low-cost interconnection of a large number of circuit elements at a low incremental cost per element would be very valuable advance in the art of forming solid state power control devices.

In the addition of components, either discrete or thick film, the preference is for the addition of resistance elements rather than capacitors because of the greater reliability of the resistances, the smaller volume of the resistances, and the lower cost of the resulting devices. In general, the thick film capacitors are limited in the thick film art by the area dimensions of the overall device in which they are incorporated inasmuch as a limited capacitance can be obtained within a given area of single thickness of thick film structure. Accordingly, it is preferred in producing circuits in thick film form to use lower value capacitors as well as fewer capacitors. The need in the solid state power control art for continued use of discrete component circuits has been largely dictated, as is evident from conventional circuit diagrams, from the need to have several capacitors of high capacitance and higher voltage values.

Another potential feature resulting from use of the thick film technique is the incorporation of an array of components which in discrete circuits would be expensive, and which can overcome the variation of the line voltage from a prescribed norm and which accordingly overcomes the need for trimming or calibration of the components.

Further, and for essentially the same reasons, the use of the unencapsulated elements in thick film circuits makes possible the use of combinations of elements having a wider tolerance of values with a circuit to give a highly reliable performance.

It is accordingly an object of the present invention to provide a low-cost solid state power control device having high performance capabilities.

It is another object of the present invention to provide a device having greater reliability of performance due to lower level of stress on the component parts.

It is still another object of the present invention to provide a device which does not require separate encapsulation of the elements thereof and which can accordingly be provided in smaller overall dimensions and at lower cost.

Additional objects and advantages of the present invention will be in part apparent and in part pointed out in the description which follows.

In one of its broader aspects the objects of the present invention may be achieved by providing a power control device having low hysteresis characteristics comprising a bidirectional solid state semiconductor multi-layer power switch element capable of being switched from a normal high impedance state to a low impedance state, said element having two power electrodes and a gate electrode, the flow of power between the said power electrodes being controllable by imposition of a current pulse through said gate electrode, a pair of power terminals electrically coupled respectively to the power electrodes of said switch element whereby said device may be connected in series in an alternating current power circuit to control the power in said circuit, a silicon bilateral switch electrically coupled to said gate electrode and to the junction of a variable resistor and a capacitor of a phase shift network, said phase shift network being serially coupled between said power terminals and in parallel with said switch, a resistor and clamping diode connected in series and serially coupled across said power terminals, to permit unidirectional flow of current to the power terminal coupled to said variable resistance, a gate lead of said silicon bilateral switch being coupled through a diode to the junction of said resistance and clamping diode to permit unidirectional flow of current from said silicon bilateral switch.

The manner in which the objects and advantages of the present invention are achieved will be better understood by reference to the accompanying drawing in which.

Figure 1:
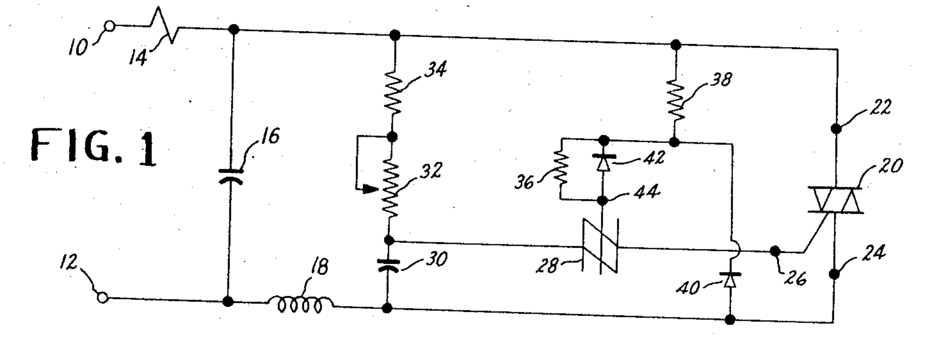
FIGURE 1 is a circuit diagram of the circuit of the present invention.

Referring first to FIGURE 1 a circuit of a power control device is shown for operation across an alternating voltage source connected at electrodes 10 and 12.

Load 14 is connected in series with the circuit of the control device so that power through the load from a power source not shown may be controlled.

Capacitor 16 and inductance 18 perform their conventional roles in such devices including filtering radio frequency generated by switching of the solid state power control element 20.

Power control element 20 is a symmetrical solid state switch normally having high impedance when a changing voltage is imposed across power electrodes 22 and 24 but which is switched to a low impedance state when the voltage exceeds a value in a range characteristic of the device, or when a triggering pulse is imposed through the trigger electrode 26.

The triggering pulse is supplied to electrode 26 from a silicon bilateral switch, SBS, 28 which may consist of two unilateral triggering units connected in reverse-parallel configuration or which may consist as used in this application of a single integrated element containing the two unilateral units connected in reverse parallel.

The SBS, 28 is a device as described in the Aug. 30, 1966 issue of Electronic Design, the disclosure of which is incorporated herein by reference, and provides a symmetrical bidirectional triggering function.

The silicon bilateral switch is also the subject of a copending application for patent of Thomas C. Mapother Ser. No. 509,700 filed Nov. 26, 1965 and assigned to the owner of the present application.

The SBS is electrically coupled between the junction of the variable resistor 32 and capacitor 30 of the phase shift network made up of these elements. The phase shift network is serially coupled through fixed resistor 34 to the power terminals 10 and 12.

Also serially coupled to power terminals 10 and 12 is resistance 38 and diode 40.

Diode 40 limits current flow through resistor 38 to one half cycle. Current flow from SBS gate 44 is limited to one half cycle by diode 42 which is serially connected between gate 44 and the junction of diode 40 with resistor 38.

In operation, the circuit of FIGURE 1 utilizes the gate lead 44 of the SBS 28 to reset the capacitor 30 at the end of the positive half cycle assuming firing did not take place prior to this.

Resetting of the voltage of capacitor 30 to zero volts is accomplished when the line voltage drops to a level below the voltage on the capacitor 30. At this point, gate current begins to flow through diode 42 and resistance 38. When the current through gate 44 is of sufficient magnitude, the SBS 28 turns on and discharges condensor 30 to zero volts through the power switch gate electrode 26.

As the line voltage begins to go negative, the common cathode connection of the diodes 40 and 42 is clamped by diode 40 to one diode drop below ground. Hence it is not possible for the SBS to turn on during the negative half cycle prior to the voltage on capacitor 30 reaching the switching potential of the SBS 28. When the SBS 28 finally fires in the negative half cycle (due to lowering resistance of variable resistance 32), the next positive going half cycle will see the same initial conditions as the previous negative going half cycle and the SBS 28 will trigger symmetrically from there on.

Further, lowering of the resistance of variable resistance 32 will simply decrease the phase angle of firing as in normal full-wave phase-control circuits.

Figure 2:
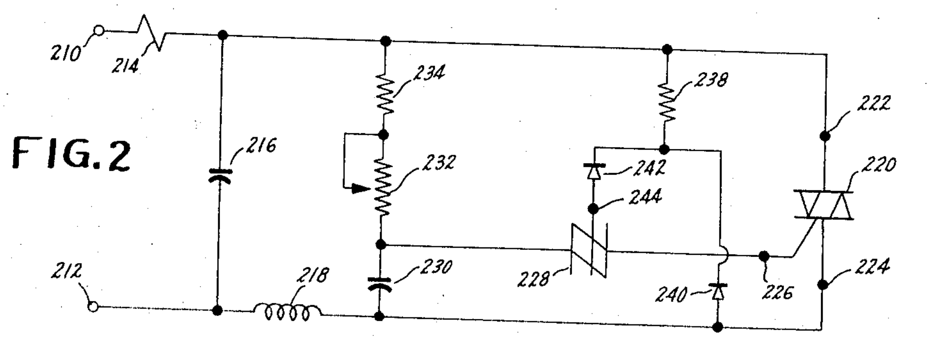
FIGURE 2 is a similar circuit diagram with a resistance element omitted.

Because of its symmetrical firing characteristic and its ability to be triggered on at the gate lead, the SBS lends itself to use in a very simple, hysteresis-free, full-wave phase-control circuit shown in FIGURE 2. Hysteresis, or "snap-on effect," ordinarily ensues when the voltage of a potentiometer such as 232 is decreased from its maximum value and the voltage of a capacitor such as 230 which is 90 degrees out of phase with the applied voltage, decreases in phase and increases in amplitude to a point where it fires an SBS and thereby triggers a power switch such as 220.

Ordinarily the SBS will then fire much sooner in the next half cycle, because the capacitor now starts its charging from zero volts instead of some finite value as it goes into the opposite half-cycle. Therefore, the state of power switch changes from no-trigeringg to triggering for a substantial portion of the cycle.

This hysteresis effect can be eliminated by simply discharging the capacitor 230 at the end of each cycle to zero volts for those values of resistance for which power switch triggering is not to take place.

Referring again to FIGURE 2, the simple full-wave phase-control circuit of FIGURE 2 utilizes the unique characteristics of the silicon bilateral switch to achieve hysteresis free operation. The circuit requires just one RC phase lag network 230, 232 along with two fairly high conductance diodes 238 and 240 and a resistor 238 as shown. For large values of resistance in the RC network, the voltage developed across capacitor 230 is not large enough to fire the SBS during the positive half cycle and it is desirable to reset the voltage of capacitor 230 back to some known point under this condition. This reset action is achieved by utilization of the gate lead 244 of the SBS. During the positive half cycle, the capacitor 230 charges up to something less than the switching voltage of the SBS and, at the end of the positive half cycle, the voltage at the gate drops below this capacitor voltage thereby turning on the SBS and resetting the capacitor essentially back to ground. During the negative going half cycle, the gate lead 244 is inhibited from triggering the SBS on by use of a clamping diode 240 and the diode drop across 242 as explained above with reference to the circuit of FIGURE 1. As the timing resistor 232 is decreased, the voltage across the capacitor increases in amplitude and decreases in phase and eventually fires the SBS in a negative going half cycle. From there on, firing takes place symmetrically in both half cycles and a full range hysteresis free operation has been achieved. One place this is particularly useful is in low voltage applications such as 12 volt arc lamp dimming applications.

The main difference between the circuit of FIGURE 1 and that of FIGURE 2 is that a slight asymmetry for initial firing values found in operation of the circuit of FIGURE 2 can be symmetrized by the addition of the resistor at the diode 42 of FIGURE 1 corresponding to diode 242 of FIGURE 2. This addition further assists in discharge of the capacitor 30 back to ground at the beginning of the positive half cycle.

Figure 3:
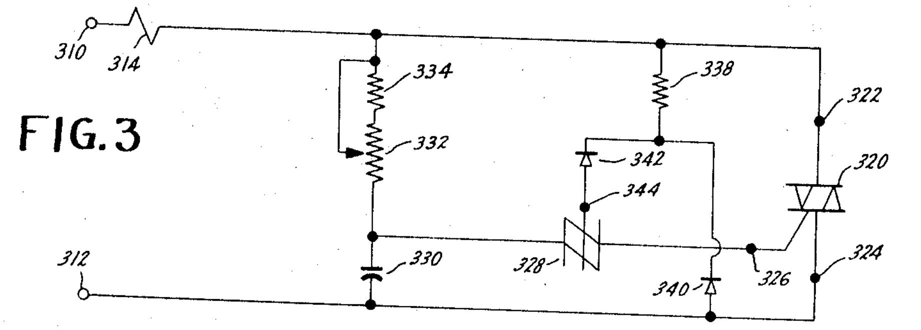
FIGURE 3 is a circuit similar to that of FIGURE 2 diagram with a resistance element combined.

FIGURE 3 illustrates a circuit similar in all respects to the circuit of FIGURE 2 with the first exception that the filter coil 218 and capacitor 216 are omitted and with the second exception that the variable resistor 232 is expanded in the circuit of FIGURE 3 to include fixed resistor 334.

Figure 4:
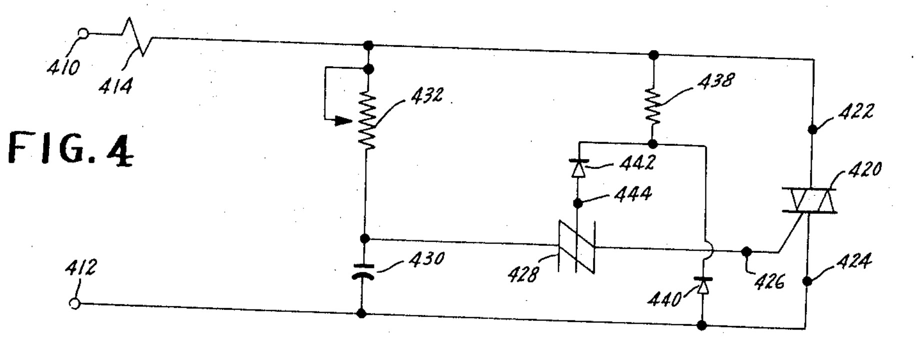
FIGURE 4 is a circuit similar to that of FIGURE 3 with an additional resistance element omitted.

FIGURE 4 illustrates a circuit similar in all respects to FIGURE 3 with the single exception that the fixed resistor 334 of FIGURE 3 is omitted in the circuit of FIGURE 4.

One of the principal advantages of the circuits described above is their capability for operation at relatively low firing angles. This gives a fuller range of effective control to the power at the terminals 10 and 12 and their counterparts in the other circuits. More importantly, however, the low firing angle permits a lower value capacitor to be employed due to the lower voltage at which firing takes place.

The lower value capacitor is important in that it permits a full hysteresis-free power control to be incorporated in a thick film device of moderate dimensions. As pointed out above, it is the overall dimensions of the capacitor elements of power control circuits which limit the application of thick film techniques to solid state power control circuitry. Accordingly it is the use of the combination of elements such as those taught in the circuits of FIGURES 1 through 4 which permit highly effective hysteresis-free solid state power devices to be built at low cost and in small size enclosures. The SBS 28 fires at a voltage of 10 volts or lower as compared to prior devices which fired at voltages of the order of 32 volts or higher. Accordingly capacitors having high reliability can be incorporated in thick film devices in a form which imposes no stress on the capacitors. Attempts to incorporate capacitors of conventional capacitor ratings into conventional solid state power control devices can impose stress on the circuit elements of a thick film which yields uncertain and unreliable performance.

Since many applications and embodiments may be made of the circuits illustratively taught herein and since some further modifications than those shown can be made without loss of advantages taught herein, the foregoing should be interpreted as illustrative and not as limiting the scope of the invention.

What is claimed is:

1. A power control device having low hysteresis characteristics comprising a bidirectional solid state semiconductor multi-layer power switch element capable of being from a normal high impedance state to a low impedance state, said element having two power electrodes and a gate electrode, the flow of power between said power electrodes being controllable by imposition of a current pulse through said gate electrodes, a pair of power terminals electrically coupled respectively to the power electrodes of said switch element whereby said device may be connected in series in an alternating current power circuit to control the power in said circuit, a silicon bilateral switch electrically coupled to said gate electrode and to the junction of a variable resistor and a capacitor of a phase shift network, said phase shift network being serially coupled between said power terminals and in parallel with said power switch, a resistor and clamping diode connected in series and serially coupled across said power terminals, to permit unidirectional flow of current to the power terminal coupled to said variable resistance, a gate lead of said silicon bilateral switch being coupled through a diode to the junction of said resistance and clamping diode to permit unidirectional flow of current from said silicon bilateral switch.

References Cited

UNITED STATES PATENTS

| | | | |
|---|---|---|---|
| 3,346,874 | 10/1967 | Howell. | |
| 3,358,218 | 12/1967 | Halpin | 323—22 |

JOHN F. COUCH, *Primary Examiner.*

A. D. PELLINEN, *Assistant Examiner.*

U.S. Cl. X.R.

307—297, 305; 323—24, 36, 38